US008283275B2

(12) United States Patent
Heo et al.

(10) Patent No.: US 8,283,275 B2
(45) Date of Patent: Oct. 9, 2012

(54) CARBON NANOTUBES, SUPPORTED CATALYST INCLUDING THE SAME, AND FUEL CELL USING THE SUPPORTED CATALYST

(75) Inventors: Jeong-na Heo, Yongin-si (KR);
Jeong-hee Lee, Yongin-si (KR);
Tae-won Jeong, Yongin-si (KR);
Shang-hyeun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1397 days.

(21) Appl. No.: 11/652,826

(22) Filed: Jan. 11, 2007

(65) Prior Publication Data
US 2010/0255402 A1    Oct. 7, 2010

(30) Foreign Application Priority Data

Feb. 23, 2006    (KR) .................. 10-2006-0017879

(51) Int. Cl.
*H01M 4/88* (2006.01)
*H01M 4/02* (2006.01)
*H01M 4/36* (2006.01)
(52) U.S. Cl. ................... 502/101; 429/523; 429/530
(58) Field of Classification Search ............ 429/483, 429/523, 530; 502/101
See application file for complete search history.

(56) References Cited

U.S. PATENT DOCUMENTS

| | | | |
|---|---|---|---|
| 2002/0110725 A1* | 8/2002 | Yamaura et al. | 429/44 |
| 2004/0018416 A1 | 1/2004 | Choi et al. | |
| 2004/0241532 A1 | 12/2004 | Kim | |
| 2005/0112451 A1* | 5/2005 | Lee et al. | 429/44 |
| 2006/0284538 A1* | 12/2006 | Harutyunyan | 313/311 |

FOREIGN PATENT DOCUMENTS

| | | |
|---|---|---|
| CN | 1418726 A | 5/2003 |
| CN | 1472135 A | 2/2004 |
| CN | 1632975 A | 6/2005 |
| CN | 1699151 A | 11/2005 |
| JP | 2004-224651 | 8/2004 |
| KR | 10-2004-0011181 | 2/2004 |

(Continued)

OTHER PUBLICATIONS

SIPO Office action dated Nov. 27, 2009, with English translation, for corresponding Chinese application 200610172556.4.

(Continued)

*Primary Examiner* — Helen O Conley
(74) *Attorney, Agent, or Firm* — Christie, Parker & Hale, LLP (57) ABSTRACT

A carbon nanotube, a method of preparing the same, a supported catalyst including the same, and a fuel cell using the supported catalyst are provided. The method of preparing the carbon nanotube includes: depositing a metal catalyst in single wall nanotubes and growing multi wall nanotubes over the single wall nanotubes using the metal catalyst. The carbon nanotubes of the present invention have satisfactory specific surface area and low surface resistance. Thus, the carbon nanotubes perform remarkably better than a conventional catalyst carrier. Accordingly, the carbon nanotubes, when used as a catalyst carrier of an electrode for a fuel cell, can improve the electrical conductivity of the fuel cell. In addition, a fuel cell employing the electrode has excellent efficiency and overall performance.

12 Claims, 5 Drawing Sheets
(3 of 5 Drawing Sheet(s) Filed in Color)

FOREIGN PATENT DOCUMENTS

| KR | 10-2004-0103706 | 12/2004 |
|---|---|---|
| KR | 10-2005-0080341 | 8/2005 |
| WO | WO 2005/075340 A1 | 8/2005 |

OTHER PUBLICATIONS

Korean Patent Abstracts, Publication No. 1020050080341A, dated Aug. 12, 2005, in the name of Young Nam Kim.

Japanese Office action dated Feb. 23, 2010, for corresponding Japanese application 2007-025756, noting listed reference in this IDS.

Shajahan, Md., et al., *High growth of SWNTs and MWNTs from $C_2H_2$ decomposition over Co-Mo/MgO catalysts*, Carbon, vol. 42, No. 11, (2004), pp. 2245-2253.

Ang, L., et al., *Decoration of activated carbon nanotubes with copper and nickel*, Carbon, vol. 38, No. 3, (2000), pp. 363-372.

Wan, M., et al., *Preparation of Multi-wall Carbon Nanotubes over Cobaltcatalyst Supported on Multi-wall Carbon Nanotubes*, Journal of Materials Science and Engineering, vol. 23, No. 6, Dec. 2005, pp. 887-890, with English translation.

SIPO Certificate of Patent dated Jul. 14, 2010, for corresponding Chinese Patent application 200610172556.4, noting listed references in this IDS.

Zhibin, He, et al., *Electrodeposition of Pt-Ru nanoparticles on carbon nanotubes and their electrocatalytic properties for methanol electrooxidation*, Diamond and Related Materials, vol. 13, (2004), pp. 1764-1770.

(Abstract only) Shajahan, Md., et al., *High growth of SWNTs and MWNTs from $C_2H_2$ decomposition over Co-Mo/MgO catalysts*, Carbon, vol. 42, No. 11, (2004), pp. 2245-2253 "On Order".

(Abstract only) Ang, L., et al., *Decoration of activated carbon nanotubes with copper and nickel*, Carbon, vol. 38, No. 3, (2000), pp. 363-372 "On Order".

J. Phys.: Condens. Matter 15 (2003) S3011-S3035 (On Order).

Moisala, A., et al., *The role of metal nanoparticles in the catalytic production of single-walled carbon nanobutesa review*, Institute of Physics Publishing, Journal of Physics: Condensed Matter, vol. 15, (2003), pp. S3011-S3035.

KIPO Notice of Allowance dated Jun. 12, 2007, for Korean priority Patent application 10-2006-0017879, noting listed references in this IDS, as well as KR Oct. 2005-0080341.

\* cited by examiner

CARBON NANOTUBES, SUPPORTED CATALYST INCLUDING THE SAME, AND FUEL CELL USING THE SUPPORTED CATALYST

CROSS-REFERENCE TO RELATED PATENT APPLICATION

This application claims priority to and the benefit of Korean Patent Application No. 10-2006-0017879, filed on Feb. 23, 2006, in the Korean Intellectual Property Office, the disclosure of which is incorporated herein in its entirety by reference.

BACKGROUND OF THE INVENTION

1. Field of the Invention

The present invention relates to a carbon nanotube, a supported catalyst including the same, and a fuel cell using the supported catalyst.

2. Description of the Related Art

Fuel cells are energy conversion devices that transform energy stored in a fuel into electricity through electrochemical reactions between the fuel and an oxidative gas. Fuel cells can be classified into solid oxide electrolyte fuel cells using a solid oxide electrolyte, which can operate at 1000° C., molten carbonate salt fuel cells, which can operate at 500-700° C.; phosphoric acid electrolyte fuel cells, which can operate at about 200° C.; and alkaline electrolyte fuel cells and solid polymer electrolyte fuel cells, which can be operate at an ambient temperature or at a temperature of about 100° C. or less.

Examples of solid electrolyte fuel cells include proton-exchange membrane fuel cells (PEMFCs) utilizing hydrogen gas as a fuel source, direct methanol fuel cells (DMFCs) which generate power using a liquid methanol solution directly supplied to an anode as a fuel source, and the like. Polymer electrolyte fuel cells are clean energy sources, can replace fossil fuels, and have high power density and high energy conversion efficiency. In addition, polymer electrolyte fuel cells can operate at an ambient temperature, and can be miniaturized and sealed. These characteristics make polymer electrolyte fuel cells a desirable choice for pollution-free vehicles, power generating systems for home use, portable telecommunications equipment, military equipment, medical equipment, space technology equipment, and the like.

PEMFCs produce a direct current through an electrochemical reaction between hydrogen and oxygen, and contain a proton-exchange membrane interposed between an anode and a cathode.

The proton-exchange membrane is formed of a solid polymer material, such as NAFION™, that has good proton conducting properties and allows minimal cross-over of unreacted gas or fuel to the cathode portion. The anode and the cathode include backing layers for supplying reaction gases or a liquid, and a catalyst for the oxidation/reduction of the reaction gases.

As a hydrogen reaction gas is supplied to the PEMFC, hydrogen molecules are decomposed into protons and electrons through an oxidation reaction in the anode. The protons permeate across the proton-exchange membrane to the cathode.

Meanwhile, oxygen is supplied to the cathode, and the oxygen accepts electrons to form oxygen ions. The oxygen ions then combine with the protons from the anode to produce water.

A gas diffusion layer (GDL) in the PEMFC is included in each of the anode and the cathode. A catalyst layer that promotes the fuel cell chemical reactions is formed on each the anode and cathode backing layers. The anode and cathode backing layers can be formed of carbon cloth or carbon paper.

DMFCs have a similar structure to PEMFCs described above, but use a liquid methanol solution instead of hydrogen as a fuel source. As a methanol solution is supplied to the anode, an oxidation reaction occurs in the presence of a catalyst to generate protons, electrons, and carbon dioxide. Although DMFCs exhibit somewhat lower energy efficiency than PEMFCs, the use of a liquid fuel in DMFCs makes the application of DMFCs to portable electronic devices easier.

SUMMARY OF THE INVENTION

The present invention, according to one embodiment, provides a carbon nanotube having a satisfactory specific surface area and excellent surface resistance, a supported catalyst including the same, and a fuel cell using the supported catalyst.

According to an embodiment of the present invention, a method of preparing carbon nanotubes is provided including: depositing a metal catalyst on single wall nanotubes; and growing multi wall nanotubes over the single wall nanotubes using the metal catalyst.

In one embodiment, the single wall nanotubes are grown through chemical vapor deposition or arc discharge.

According to another embodiment of the present invention, carbon nanotubes are prepared using the method described above.

In an embodiment, the surface resistance of the carbon nanotubes may be in the range of 1 to 30 mohm/sq, and is preferably about 8 mohm/sq. In one embodiment, the BET specific surface area may be in the range of 100 to 1,000 $m^2/g$, and is preferably about 200 $m^2/g$. In another embodiment, the ratio of the G band peak integral ($I_G$) to the D band peak integral ($I_D$) of the Raman analysis spectrum of the carbon nanotubes may be 3 or greater, and the Raman analysis spectrum of the carbon nanotubes may show a RGB mode peak. The ratio of $I_G$ and $I_D$ depends on the growing method of the multi wall nanotubes. When arc discharge, which has an ability to provide good crystallization, is used to grow the multi wall nanotubes, the ratio may be large.

According to another embodiment of the present invention, a supported catalyst is provided including the carbon nanotubes described above and a metal catalyst. In one embodiment, the surface resistance of the carbon nanotubes may be in the range of 1 to 30 mohm/sq and the BET specific surface area of the carbon nanotubes may be in the range of 100 to 1,000 $m^2/g$. In another embodiment, the amount of the metal catalyst may be in the range of 40 to 80 wt % of the supported catalyst.

According to another embodiment of the present invention, a fuel cell is provided employing an electrode including the supported catalyst described above.

BRIEF DESCRIPTION OF THE DRAWINGS

The patent or application file contains at least one drawing executed in color. Copies of this patent or patent application publication with color drawing(s) will be provided upon request and payment of the necessary fee.

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
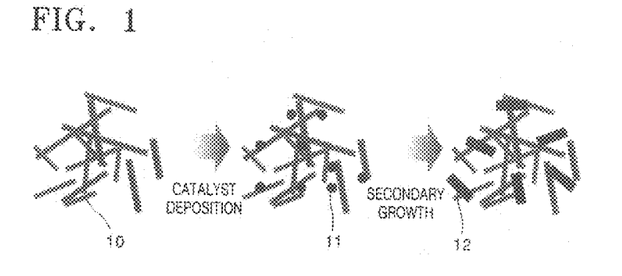
FIG. 1 is a schematic drawing illustrating a method of manufacturing carbon nanotubes according to an embodiment of the present invention.

Referring to FIG. 1, the carbon nanotubes are prepared by depositing a metal catalyst 11 on single wall nanotubes (SWNT) 10 having an excellent specific surface area. Through secondary growth, multi wall nanotubes (MWNT) 12 having excellent crystallization properties are grown. The carbon nanotubes have a satisfactory specific surface area and excellent surface resistance, thus providing excellent electrical conductivity.

The SWNT 10 can be obtained by forming a first metal catalyst layer and growing carbon nanotubes by using the first metal catalyst layer. Alternatively, a commercial product such as NANOCYL® available from Nanocyl in Sambreville, Belgium, CNI® available from Carbon Nanotechnologies Inc. in Houston, Tex., or products from Iljin Nanotech Co. available in Seoul, Korea can be used.

The metal catalyst 11 used for secondary growth of the MWNT 12 may be selected from the group consisting of nickel, iron, cobalt, and alloys thereof. The metal catalyst may be in a transition metal state or in an ionic state.

The amount of the metal catalyst 11 may be in the range of 0.1 to 100 parts by weight based on 100 parts by weight of the SWNT 10. Any method of depositing a metal catalyst into the SWNT 10 can be used to grow the carbon nanotubes. Specifically, a liquid phase method that can uniformly disperse a precursor of a transition metal such as Ni, Fe, Co, Pd, etc., that is, a metal acetate, a metal nitrate such as $Fe_2(NO_3)_3 \cdot 9H_2O$, a metal-organic compound such as nickel (II) acetylacetonate or copper (II) acetylacetonate, ferrocene, etc. in single carbon nanotubes may be used (Ref.: J. Phys.: Condens. Matter 15 (2003) S3011-S3035).

In the secondary growth, any conventional method used to grow carbon nanotubes can be used. Examples of the methods include a chemical vapor deposition (CVD) method such as a thermal CVD method, a DC plasma CVD method, an RF plasma CVD method or a microwave plasma CVD method, and an arc discharge method.

When the crystallization of the MWNT is excellent, electrical conductivity of the prepared carbon nanotubes are high. Accordingly, a higher temperature during the growth of the MWNT is better. In one embodiment, when a CVD method is used, the temperature may be in the range of 450 to 650° C., and in another embodiment is in the range of 600 to 650° C. When an arc discharge method is used, the temperature may be at least 650° C.

The BET specific surface area of the carbon nanotubes according to the current embodiment of the present invention may be in the range of 100 to 1,000 m²/g, and the surface resistance of the carbon nanotubes according to an embodiment of the present invention may be in the range of 1 to 30 mfg/sq, which is very small. Accordingly, the electrical conductivity of the carbon nanotubes is high. Particularly, the carbon nanotubes have both the satisfactory specific surface area of an SWNT and the low surface resistance of an MWNT.

In one embodiment, when the carbon nanotubes are analyzed using Raman analysis, the ratio of a G band peak integral ($I_G$) and a D band peak integral ($I_D$) is 3 or greater, and a RGB mode peak is shown. Here, the RGB mode peak is a peak having a wave number in the range of 100 to 300 cm$^{-1}$. Preferably, in one embodiment, the ratio of the G band peak integral ($I_G$) to the D band peak integral ($I_D$) is in the range of 3 to 10,000.

In one embodiment, the carbon nanotubes can be used as a catalyst carrier of a fuel cell. The supported catalyst includes the carbon nanotubes and a catalyst metal particle dispersed and supported on the carbon nanotubes.

Examples of the catalyst metals include titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tin (Sn), platinum (Pt), ruthenium (Ru), palladium (Pd), tungsten (W), iridium (Ir), osmium (Os), rhodium (Rh), niobium (Nb), tantalum (Ta), lead (Pb), and mixtures thereof, but is not limited thereto.

A suitable catalyst metal can be selected based on a specific reaction that the supported catalyst needs to facilitate. In an embodiment, the catalyst metal may be a single metal or an alloy of at least two metals. For example, when the supported catalyst is used in a catalyst layer of a cathode or an anode of a fuel cell such as a phosphoric acid fuel cell (PAFC), a proton exchange membrane fuel cell (PEMFC), etc., the catalyst metal may be platinum. As another example, when the supported catalyst is used in a catalyst layer of an anode of DMFC, the catalyst metal may be a platinum-ruthenium alloy, and the atomic ratio of platinum and ruthenium may typically be in the range of about 0.5:1 to 2:1. As another example, when the supported catalyst is used in a catalyst layer of a cathode of a direct methanol fuel cell (DMFC), the catalyst metal may be platinum.

In one embodiment, the average particle size of the metal catalyst may be in the range of about 1 to 5 nm. When the average particle size of the metal catalyst is less than 1 nm, the metal catalyst may not accelerate a catalyst reaction. When the average particle size of the metal catalyst is greater than 5 nm, the reaction surface area of the entire catalyst particle may decrease, and thus, the activity of the metal catalyst may be low.

in one embodiment, the amount of the metal catalyst in the supported catalyst ma$_y$ be in the range of about 40 to 80 wt % of the supported catalyst. When the amount of the metal catalyst in the supported catalyst is less than 40 wt %, it may be impossible to use the supported catalyst in a fuel cell. When the amount of the metal catalyst in the supported catalyst is greater than 80 wt %, the cost of the catalyst increases without a corresponding increase in the effect of the catalyst and the catalyst particle size may be larger than necessary.

To prepare the supported catalyst, various methods of preparing a supported catalyst can be used. For example, the supported catalyst may be prepared by impregnating a catalyst metal precursor solution into a carrier and reducing the catalyst metal precursor. Since such methods are disclosed in various documents in detail, descriptions thereof will be omitted herein.

A fuel cell according to an embodiment of the present invention includes a cathode, an anode, and an electrolyte membrane interposed between the cathode and the anode. At least one of the cathode and the anode contains the supported catalyst according to an embodiment of the present invention.

Figure 6:
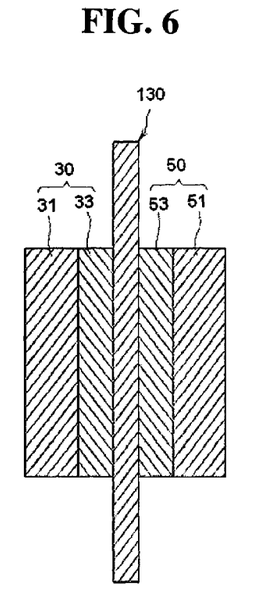
FIG. 6 is a schematic drawing of a membrane electrode assembly according to an embodiment of the present invention.

In one embodiment, referring to FIG. 6, the membrane-electrode assembly includes a polymer electrolyte membrane 130, an anode 30, a cathode 50, catalyst layers 33, 53, on both surfaces of the polymer electrolyte membrane 130, and gas diffusion layers 31, 51 disposed on the outside surfaces of the catalyst layers 33, 53.

The fuel cell may be a PAFC, a PEMFC, or a DMFC, but is not limited thereto. The structure and preparation method of the fuel cell are not limited, and details are disclosed in various documents familiar to those of skill in the art, and thus, a detailed description thereof is omitted herein.

The present invention will be described in greater detail with reference to the following examples. The following examples are for illustrative purposes only and are not intended to limit the scope of the invention.

Preparation Example 1

Preparation of a Carbon Nanotube 0.25 g of a SWNT (CNI) and 0.09 g of $NiCl_2 \cdot 6H_2O$ (or $Ni(CH_3COO)_2$) as a precursor of a nickel catalyst were mixed with 100 g of water and 80 g of ethyleneglycol for 24 hours at 100° C. Then the mixture was dried as liquid. Subsequently, thermal vapor deposition was performed on the dried mixture using acetylene gas at 650° C. For secondary growth, a MWNT was grown for 10 minutes to prepare carbon nanotubes.

Figure 2:
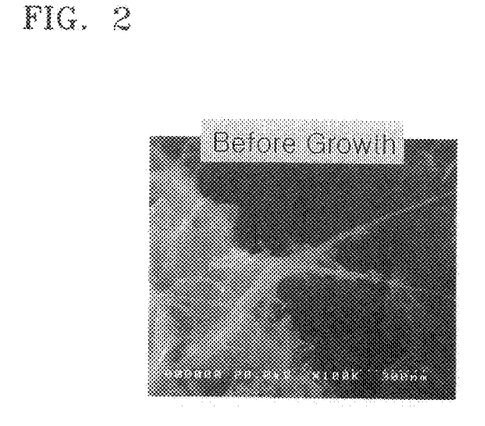
FIGS. 2 and 3 are scanning electron microscope images of carbon nanotubes according to an embodiment of the present invention obtained in Preparation Example 1 respectively illustrating before and after secondary growth.
Figure 3:
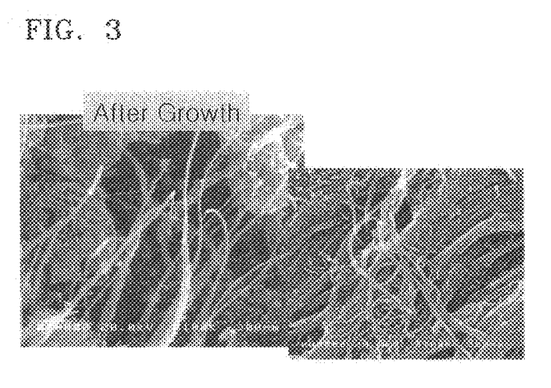

FIGS. 2 and 3 are scanning electron microscope images of carbon nanotubes obtained according to Preparation Example 1, respectively illustrating before and after the secondary growth;

In FIGS. 2 and 3, a MWNT was mixed with a SWNT.

Figure 4:
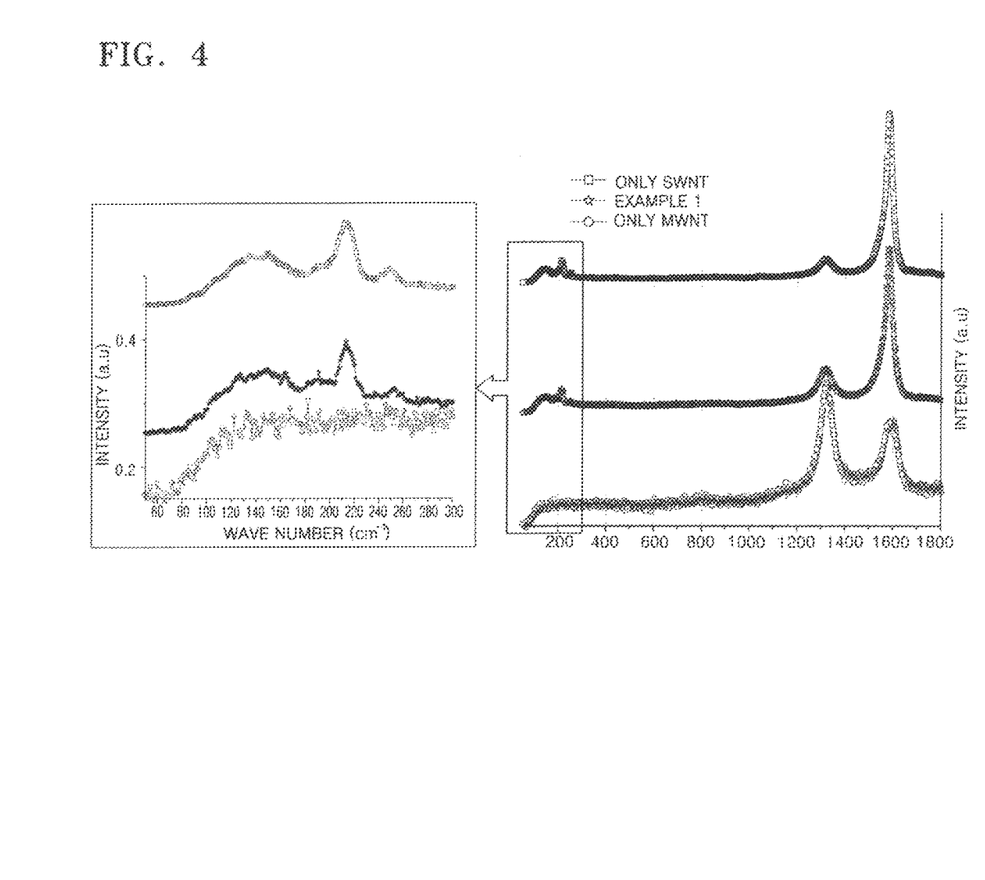
FIG. 4 is a Raman analysis spectrum of the carbon nanotubes according to an embodiment of the present invention obtained in Preparation Example 1.

The carbon nanotubes obtained according to Preparation Example 1 was analyzed using Raman analysis, and the results are shown in FIG. 4. The Raman analysis spectrum of the SWNT and the MWNT are shown together in FIG. 4.

Referring to FIG. 4, the SWNT showed a G peak (~1600 $cm^{-1}$) and a clear RBM mode peak. On the other hand, the MWNT had a stronger D peak (1320 $cm^{-1}$) than a G peak compared to the SWNT, and did not show an RBM mode peak.

The carbon nanotubes of Preparation Example 1 had a stronger D peak, and showed an RBM mode peak as well.

Figure 5:
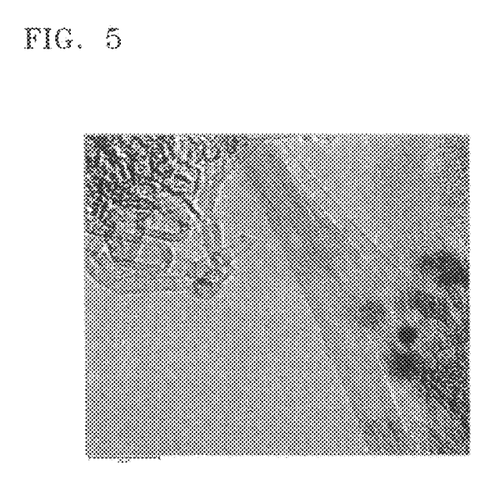
FIG. 5 is a transmission electron microscope image of the carbon nanotubes according to an embodiment of the present invention obtained according to Preparation Example 1 after the secondary growth.

FIG. 5 is a transmission electron microscope image of the carbon nanotubes obtained according to Preparation Example 1 after the secondary growth.

In FIG. 5, a SWNT and a MWNT coexist.

Example 1

Preparation of a Fuel Cell 0.5 g of the carbon nanotubes of Preparation Example 1 was put into a plastic bag. Separately, 0.9616 g of $H_2PtCl_6$ was dissolved in 1.5 ml of acetone. The solution was put into the plastic bag with the carbon nanotubes to be mixed.

The mixture was dried in air for 4 hours, and then put in a crucible. The mixture in the crucible was dried at 60° C. in a drier overnight. Next, heat was applied to the crucible, and then nitrogen was supplied to the crucible for 10 minutes. Then, hydrogen was supplied to the crucible instead of nitrogen, while the temperature was increased to 200° C. The temperature was maintained at 200° C. for 2 hours to reduce platinum chloride supported on the carbon carrier. Then, nitrogen was supplied to the crucible instead of hydrogen, and then the temperature was raised to 250° C. at 5° C./min. The temperature was maintained at 250° C. for 5 hours, and the resultant was cooled to obtain a supported catalyst.

The supported catalyst was dispersed in a dispersion of isopropylalcohol and NAFION™ 115 (manufactured by DuPont) to prepare a slurry. Using a spray method, the slurry was coated on a carbon paper at a density of 3 mg/$cm^2$, which is 3 mg of platinum per slurry on 1 $cm^2$ of the carbon paper. Subsequently, the carbon electrode was passed through a rolling machine to increase the adhesive strength between the catalyst layer and the carbon electrode. Accordingly, a cathode was prepared. Commercially obtained PtRu black catalyst was used as to form an anode, and a unit cell was prepared using the prepared anode and cathode.

Comparative Example 1

A fuel cell was prepared according to Example 1, except that a SWNT available from CNI was used instead of the carbon nanotube of Preparation Example 1.

Comparative Example 2

A fuel cell was prepared according to Example 1, except that a MWNT available from Showha Denko was used instead of the carbon nanotube of Preparation Example 1.

Comparative Example 3

A fuel cell was prepared according to Example 1, except that a mixture of a SWNT available from CNI and a MWNT available from Showha Denko in a weight ratio of 3:1 was used instead of the carbon nanotube of Preparation Example 1.

The amount of supported platinum of the supported catalysts obtained from Example 1 and Comparative Examples 1 through 3 were measured using induced coupled plasma analysis. The results are shown in Table 1.

Also, the BET surface area, and the surface resistance of the carbon nanotube, and the average platinum particle size of the supported catalysts each used for Example 1 and Comparative Example 1 through 3 were measured. The results are also shown in Table 1. Here, the average platinum particle size was measured through X-ray diffraction.

TABLE 1

| Examples | BET surface area (m²/g) | Surface resistance (mohm/sq) 100K Kgf/cm² | Pt particle size (nm) | Amount of impregnated Pt (wt %) |
|---|---|---|---|---|
| Example 1 | 254.6 | 8.44 | 3 | 67.6 |
| Comparative Example 1 | 717 | 56.8 + 0.3 | 3.1 | 56 |
| Comparative Example 2 | 44 | 7.6 + 0.1 | 5.1 | 56 |
| Comparative Example 3 | 243 | 41.9 ± 0.3 | 3.6 | 67 |

Referring to Table 1, the amount of Pt supported on the carbon nanotube of Comparative Example 1 was 56 wt %, and the average Pt particle size of Comparative Example 1 was 3.1 nm. The amounts of Pt supported on the carbon nanotube of Comparative Examples 2 and 3 were 56 wt % and 67 wt %, respectively. The average Pt particle sizes of Comparative Examples 2 and 3 were 5.1 nm and 3.6 nm respectively. The amount of Pt supported on the carbon nanotube of Example 1 was 58 wt % and the average Pt particle size of Example 1 was 3 nm. These results show that the process that is being currently used is applicable to preparation of supported catalyst of the present invention.

The performance of the unit cells of Example 1 and Comparative Examples 1 through 3 was analyzed at 50° C. by supplying excessive 2 M methanol and excessive air to the fuel cells.

As a result, it was found that the performance of the unit cell of Example 1 was better than the performance of the unit cells of Comparative Examples 1 through 3.

The carbon nanotubes of the present invention have satisfactory specific surface area and low surface resistance. Thus, the carbon nanotubes perform remarkably better than a conventional catalyst carrier. Accordingly, the carbon nanotubes, when used as a catalyst carrier of an electrode for a fuel cell, can improve the electrical conductivity of the fuel cell. In addition, a fuel cell employing the electrode has excellent efficiency and overall performance.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of preparing carbon nanotubes for a fuel cell catalyst support comprising:
   depositing a metal catalyst on single wall nanotubes; and
   growing multi wall nanotubes over the single wall nanotubes using the metal catalyst, wherein the multi wall nanotubes are grown by chemical vapor deposition at a temperature in the range of 600 to 650° C., and the nanotubes have a surface resistance in the range of 1 to 30 mohm/sq and a BET specific surface area in the range of 100 to 1,000 m²/g.

2. The method of claim 1, wherein the metal catalyst includes at least one catalyst selected from the group consisting of nickel, iron, cobalt and alloys thereof.

3. Carbon nanotubes prepared using the method of claim 1.

4. The carbon nanotubes of claim 3, wherein the ratio of a G band peak integral ($I_G$) to a D band peak integral ($I_D$) of a Raman analysis spectrum of the carbon nanotubes is 3 or greater, and the Raman analysis spectrum of the carbon nanotube shows an RGB mode peak.

5. A supported catalyst comprising:
   carbon nanotubes prepared by depositing a first metal catalyst on single wall nanotubes and growing multi wall nanotubes on the single wall nanotubes using the metal catalyst, wherein the multi wall nanotubes are grown by chemical vapor deposition at a temperature in the range of 600 to 650° C., and the nanotubes have a surface resistance in the range of 1 to 30 mohm/sq and a BET specific surface area in the range of 100 to 1,000 m²/g; and
   a second metal catalyst supported on at least the multi wall nanotubes.

6. The supported catalyst of claim 5, wherein the amount of the second metal catalyst is in the range of 40 to 80 wt % of the supported catalyst.

7. A membrane electrode assembly employing an electrode comprising the supported catalyst of claim 5.

8. A fuel cell employing the membrane electrode assembly of claim 7.

9. The supported catalyst of claim 5, wherein the first catalyst metal is different from the second catalyst metal.

10. The supported catalyst of claim 9, wherein the first metal catalyst includes at least one catalyst selected from the group consisting of nickel, iron, cobalt and alloys thereof.

11. The supported catalyst of claim 9, wherein the second metal catalyst includes at least one catalyst selected from the group consisting of Ti, V, Cr, Mn, Fe, Co, Ni, Cu, Zn, Al, Mo, Se, Sn, Pt, Ru, Pd, W, Ir, Os, Rh, Nb, Ta, Pb, and mixtures thereof.

12. The supported catalyst of claim 5, wherein the average particle size of the second metal catalyst is in the range of about 1 to about 5 nm.

* * * * *